United States Patent [19]

Petersen

[11] Patent Number: 5,024,868

[45] Date of Patent: Jun. 18, 1991

[54] DUST CONTROL MAT AND METHOD OF MANUFACTURING SAME

[75] Inventor: Helle B. Petersen, Aarhus, Denmark

[73] Assignee: Milliken Denmark A/S, Morke, Denmark

[21] Appl. No.: 423,846

[22] Filed: Oct. 19, 1989

[51] Int. Cl.$^5$ .................. B32B 3/02; B32B 33/00; D03D 27/00

[52] U.S. Cl. .................. 428/88; 428/85; 428/95; 428/216; 428/219

[58] Field of Search .................. 428/85, 88, 95

[56] References Cited

U.S. PATENT DOCUMENTS

| | | | |
|---|---|---|---|
| 3,953,631 | 4/1976 | Gordon | 428/88 X |
| 3,956,551 | 5/1976 | Richards | 428/88 |
| 4,399,176 | 8/1983 | Bell et al. | 428/85 |
| 4,522,857 | 6/1985 | Higgins | 428/95 |
| 4,530,870 | 7/1985 | Brazier | 428/95 |
| 4,853,280 | 8/1989 | Poteet | 428/85 X |
| 4,917,932 | 4/1990 | McClung | 428/95 X |

Primary Examiner—George F. Lesmes
Assistant Examiner—D. R. Zirker

[57] ABSTRACT

A dust control mat (5) with pile and a caoutchouc or plastic backing (6) comprises a layer (1) of pile and a nonwoven primary bottom thereof being fixed to the backing material (6). A flexible reinforcing layer consists of fibers selected from nonwoven materials and spun-bonded materials, the fibers of which have been heat fixed and crosslinked, and whereby at least a part of at least one of the side edges of the reinforcing layer (3) has been exposed on the surface of the backing (3) within the piled area.

8 Claims, 1 Drawing Sheet

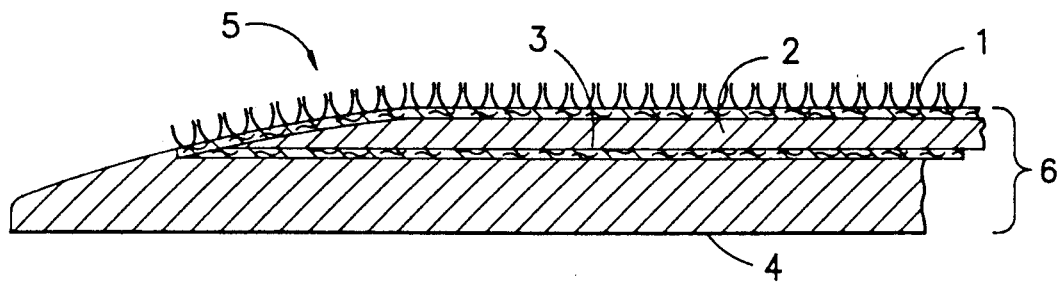
FIG. -1-
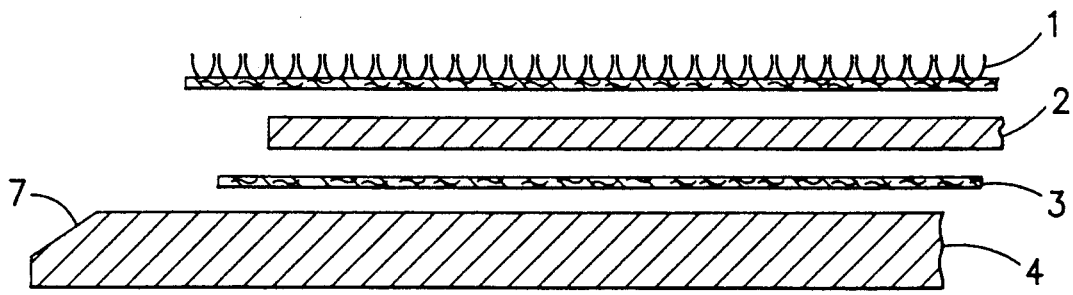
FIG. -2-

DUST CONTROL MAT AND METHOD OF MANUFACTURING SAME

The invention relates to a dust control mat having a pile and a caoutchouc or plastic backing and wherein the pile and a nonwoven primary bottom thereof have been fixed in the backing material.

The prior mats of this kind involve the disadvantage that they cannot remain in place on the floor on which they have been arranged, e.g. when they are wheeled over by vehicles, such as trucks, mobile shopping baskets or the like vehicles having wheels or rollers. This is due to the fact that directly in front of each wheel it forms a rippling or a half-wavelike formation in the mat, and said rippling is pushed forward by the wheels across the mat to the opposite edge thereof. This results in the mat as a whole being displaced in the rolling direction of the wheels, e.g. 0.01-0.1 inch each time a vehicle passes the mat.

The purpose of this invention is to eliminate said disadvantage without substantially reducing the flexibility of the mat, as said flexibility is a prerequisite for the mat being easily washable by the known washing technique.

Said purpose is according to the invention achieved by a dust control mat, wherein a very flexible reinforcing layer has been embedded in the backing, said layer preferably consisting of fibers selected from nonwoven materials and spun-bonded materials, wherein the fibers have been heat fixed and crosslinked, and wherein at least a part of at least one of the side edges of the reinforcing layer has been exposed on the upper surface of the backing within the piled area. Thereby it has surprisingly been found that service mats have been obtained without said rippling tendency. In other words, the mat becomes wheel proof and remains in place.

In a preferred embodiment the backing comprises a sandwich construction consisting of two layers of backing material, namely an upper and a lower backing layer with said reinforcing layer therebetween, which preferably by means of a hot press have been joined together with the two backing layers simultaneously with the fixing of the pile and primary bottom layer to the sandwich backing, wherein preferably at least the lower backing layer has an edge bevelling forming a ramp, wherein at least a part of at least one of the side edges of the reinforcing layer has been exposed between the upper and lower backing layer, and wherein the edge area of the outermost backing layer extends 1-5 cm beyond the upper backing layer, preferably by 2-5 cm.

The invention will now be described in more detail by means of an example and with reference to the drawings in which FIG. 1 shows a second through the side edge of a mat according to the invention with a reinforcing layer embedded therein, and FIG. 2 shows an exploded view of the individual layers in a second of the side edge before being treated in the hot pressing or vulcanization process.

As shown in FIG. 1 the dust control mat 5 according to the invention consists of an upper layer 1 consisting of a pile with a nonwoven primary bottom for the pile, and said layer 1 has been fixed in the caoutchouc or plastic backing 6 of the mat by means of a hot pressing and/or vulcanizing process. Embedded into the backing 6 is a flexible reinforcing layer 3 of spun-bonded or nonwoven material, the fibers of which are heat fixed and crosslinked. The material of the reinforcing layer 3 may be polyester, polypropylene, nylon or the like and may have a thickness of 0.3-0.6, preferably 0.4 mm measured by thickness metering according to DIN 53 855 and 54 316. The gram weight of the reinforcing layer material 3 is between 80 and 150 g/m$^2$, preferably 120 g/m$^2$. As shown the backing material layer 6 may consist of a sandwich construction comprising of two layers of rubber, viz. an upper inner caoutchouc layer 2 and a lower caoutchouc layer 4, between which layers the reinforcing layer 3 has been arranged and joint vulcanized with the two caoutchouc layers 2, 4 simultaneously with the press vulcanization onto the backing of the layer 1 consisting of the pile and the primary bottom. The lower layer 4 extends beyond the upper layer 2 and may be provided with an approach ramp. Also the upper layer 2 may be provided with a similar ramp shape. The reinforcing layer 3 does not necessarily—as shown in FIG. 2—extend beyond the two layers 2, 4, but may be arranged in such a way that it is no more than just visible between the layers, and it needs not be visible between the layers 2, 4 all around the mat edges, but needs only be visible along part of the edge of the mat, seeing that the reinforcing layer serves as conducting layer for the gas expulsion between the two caoutchouc layers 2, 4 during the press vulcanization process. The upper caoutchouc layer 2 has e.g. a thickness of 0.8-1.5 mm, preferably 1.0 mm, while the lower caoutchouc layer 4 may have a thickness of 1-2 mm, preferably 1.8 mm.

The invention also relates to a method of manufacturing a dust control mat, whereby a pile layer, a primary bottom and a caoutchouc or plastic backing 6 are joined in a hot press to form a unit. This has been illustrated in FIG. 2. Before said joining the caoutchouc or plastic backing 6 is here built up by an upper backing layer 2, a lower backing layer 4 and an intermediate, very flexible reinforcing layer 3, such as a layer of fibers selected from nonwoven materials and spun-bonded materials, wherein the fibers have been heat fixed and crosslinked or will be so during the hot press operation, and whereby the area of the reinforcing layer 3 is less than that of the layer 4, however larger than or equal to the area of the layer 2 as will appear from the drawing. The layer 1 of a pile with a primary bottom is arranged on top of the upper backing layer 2. Then the layers arranged one upon the other are arranged in a hot press for a joint vulcanization of the caoutchouc layers with the textile layers, until the edge shape shown in FIG. 1 is achieved. Instead of caoutchouc layers plastic layers may be used, in which case no vulcanization process but a softening process with heat will be used, and whereby the backing layers 2 and 4 are then made of thermoplastic material which during the hot press operation will be heated to a temperature for a mutual adhesion between the four layers to take place.

Only in cases where the layer 1 of the mat manufactured is forcibly removed in the edge area of the finished mat, it will be visible, that at least part of the reinforcing layer 3 is extending to or out on the surface of the backing layer 6, seeing that the layer 1 as shown in FIG. 1 covers the exposed side edge parts of the reinforcing layer 3.

I claim:

1. A dust control mat comprising a pile layer, a backing layer of rubber or plastic material and a flexible nonwoven reinforcing layer embedded in said backing layer, said nonwoven layer having fibers of nonwoven and spun bonded materials which are heat set and cross-linked, said nonwoven layer extending to a point adjacent said pile layer and having one edge thereof abutting the underside of said pile layer preventing the exposure thereof to an area surrounding said dust control mat.

2. The dust control mat of claim 1 wherein said backing layer consists of an upper layer and a lower layer with said nonwoven layer therebetween, said lower layer extending outwardly beyond said nonwoven layers and having a bevelled edge.

3. The dust control mat of claim 1 wherein the lower layer extends 1-5 cm beyond the edge of the upper layer.

4. The dust control mat of claim 1 wherein the lower layer extends 1-2 beyond the upper layer.

5. The dust control mat of claim 3 wherein the upper layer has a thickness of 0.82-2.5 mm, the nonwoven layer a thickness of 0.3-0.6 mm and the lower layer having a thickness of 1-2 mm.

6. The dust control mat of claim 3 wherein said upper layer has a thickness of 1.0 mm, said nonwoven layer a thickness of 0.4 mm and the lower layer a thickness of 1.8 mm.

7. The dust control mat of claim 6 wherein the weight of said nonwoven layer is approximately 120 grams/square meter.

8. Method of manufacturing a dust control mat comprising the steps of: placing one on tope of the other, a lower backing layer of rubber or plastic material, a layer of nonwoven synthetic material shorter than and on top of the lower layer, an upper layer of rubber or plastic material shorter than and on top of the nonwoven material and a top layer of pile fabric longer than the nonwoven material on top of the upper layer, placing the layers into a hot press and activating the hot press to bond the layers together and cause the top pile layer to bend over the upper layer and the nonwoven layer to prevent exposure of the nonwoven material to the outside.

* * * * *

UNITED STATES PATENT AND TRADEMARK OFFICE
CERTIFICATE OF CORRECTION

PATENT NO. : 5,024,868
DATED : June 18, 1991
INVENTOR(S) : Helle B. Petersen

It is certified that error appears in the above-identified patent and that said Letters Patent is hereby corrected as shown below:

CLAIM 4: Column 3, line 17 insert --cm-- after "1-2"

CLAIM 8: Column 4, line 9 delete "tope" and substitute --top--

Signed and Sealed this

Twenty-third Day of November, 1993

Attest:

BRUCE LEHMAN

Attesting Officer    Commissioner of Patents and Trademarks